United States Patent
Akiyama et al.

(10) Patent No.: US 6,768,940 B2
(45) Date of Patent: Jul. 27, 2004

(54) ENGINE TESTING SYSTEM USING TORQUE CONTROLLER DESIGNED BY μ-SYNTHESIS METHOD

(75) Inventors: Takao Akiyama, Tokyo (JP);
Masayasu Kanke, Saitama (JP);
Yoshimasa Sawada, Saitama (JP);
Minoru Kobayashi, Chiba (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 105 days.

(21) Appl. No.: 10/268,078

(22) Filed: Oct. 10, 2002

(65) Prior Publication Data

US 2003/0088345 A1 May 8, 2003

(30) Foreign Application Priority Data

Nov. 8, 2001 (JP) ........................................ 2001-343238

(51) Int. Cl.[7] ............................................. G01M 15/00
(52) U.S. Cl. ......................... 701/114; 701/29; 701/35; 701/51; 73/862.01; 73/117.3
(58) Field of Search .............................. 701/114, 110, 701/115, 29, 35, 54, 51; 73/117.3, 116, 862.01, 862.36

(56) References Cited

U.S. PATENT DOCUMENTS

| 4,995,139 A | * | 2/1991 | Suzuki ........................ 73/116 |
| 5,078,008 A | * | 1/1992 | Yagi et al. .................... 73/117 |
| 6,434,454 B1 | | 8/2002 | Suzuki | |

FOREIGN PATENT DOCUMENTS

JP        6-174597 A  *  6/1994  .......... G01M/15/00

* cited by examiner

*Primary Examiner*—Hieu T. Vo
(74) *Attorney, Agent, or Firm*—Foley & Lardner LLP

(57) ABSTRACT

An engine testing system has a torque control system which controls at least one of an axial torque and an engine load torque. The torque control system comprises a mechanical transfer function which receives an engine torque and a current and outputs an engine speed, the axial torque and a dynamo speed, an electric transfer function which receives a command current and outputs the current, and a torque controller which receives one of a command axial torque and a command engine load torque, and at least one of the engine speed, the dynamo speed, and the axial torque and outputs the command current. A transfer function representative of the torque controller is designed using the structured singular value synthesis method so as to be adapted to the mechanical transfer function and the electric transfer function.

16 Claims, 6 Drawing Sheets

ENGINE TESTING SYSTEM USING TORQUE CONTROLLER DESIGNED BY µ-SYNTHESIS METHOD

BACKGROUND OF THE INVENTION

The present invention relates to a system and method of measuring characteristics of an engine, and more particularly to an engine testing system (so-called engine bench system) for measuring various characteristics of an engine by directly connecting the engine with a dynamometer functioning as a driving power absorber and to a method of measuring the engine characteristics.

Generally, an engine testing system is constructed by connecting a dynamometer with a combination of an engine and a transmission. The control of the engine is executed by controlling a throttle opening of the engine, and the control of the dynamometer is executed by controlling a speed and a torque on the basis of detection signals detected by a speed detector and a torque detector provided in the dynamometer. This control is executed by PID control (Proportional, Integral and Derivative Control) using a controller.

SUMMARY OF THE INVENTION

However, such an engine testing system using the PID control has a possibility that the shaft connecting the dynamometer and the engine may cause resonance vibration due to a pulsation torque generated by the engine. Therefore, it is necessary to execute the PID control of the dynamometer within an engine operation range where a frequency of a pulsation vibration generated by the engine is smaller than a resonance frequency of a mechanical system of the dynamometer, the shaft, and the engine. Therefore, it is difficult to execute the speed control and the axial torque control in high-responsibility under this limitation by the mechanical system resonance frequency.

Although it is possible to design the mechanical system using a high rigidity shaft so that the resonance frequency of the mechanical system becomes out of an operation range of the engine, a torque control using the PID control has a limitation that uncertain factors such as an engine pulsation torque affects the control response of the torque control.

It is therefore an object of the present invention to provide a system and method which is capable of stably measuring engine characteristics in high speed by constructing a torque control system of the system via the structured-singular-value synthesis method.

An aspect of the present invention resides in a system for measuring characteristics of an engine. The system is constructed by connecting the engine with a dynamometer via a shaft. The system comprises a torque control system which controls at least one of an axial torque of the shaft and an engine load torque. The torque control system comprises a first block represented by a mechanical transfer function, a second block represented by an electric transfer function, and a torque controller. The first block receives an engine torque and a current and outputs an engine speed, the axial torque and a dynamo speed. The second block receives a command current and outputs the current. The torque controller receives one of a command axial torque and a command engine load torque, and at least one of the engine speed, the dynamo speed, and the axial torque and outputs the command current. The torque controller is represented by a transfer function which is designed using the structured singular value synthesis method so as to be adapted to the mechanical transfer function and the electric transfer function.

Another aspect of the present invention resides in a method for measuring characteristics of an engine using a torque control system for controlling at least one of an axial torque and an engine load torque in a system of the engine, the dynamometer, and the shaft. The method comprises the steps of: receiving an engine torque and a current and outputting an engine speed, the axial torque and a dynamo speed; receiving a command current and outputting the current; and receiving one of a command axial torque and a command engine load torque, and at least one of the engine speed, the dynamo speed, and the axial torque and outputting the command current, by means of a torque controller which is represented by a transfer function designed using the structured singular value synthesis method so as to be adapted to the mechanical transfer function and the electric transfer function.

The other objects and features of this invention will become understood from the following description with reference to the accompanying drawings.

DETAILED DESCRIPTION OF THE INVENTION

Figure 1:
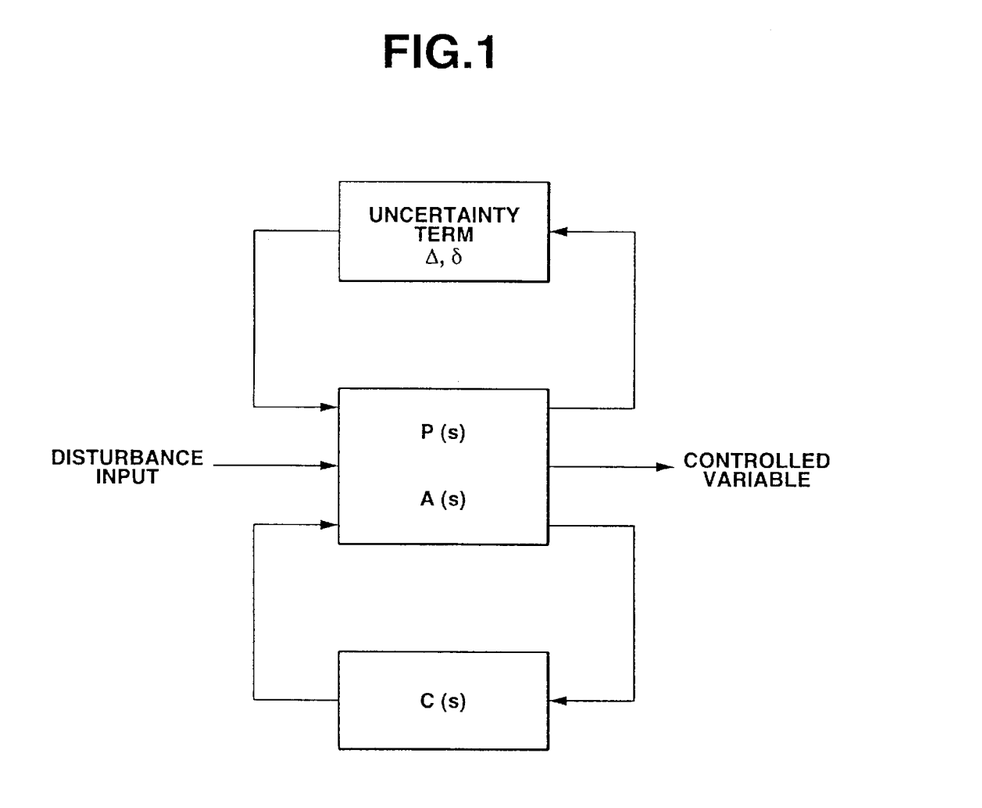
FIG. 1 is a block diagram showing a basic concept employed in an engine testing system and a method for measuring engine characteristics using the system according to the present invention.
Figure 2A:
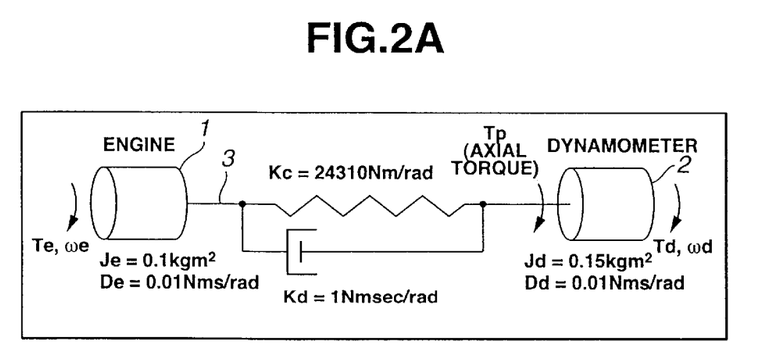
FIG. 2A is a view showing a modeled vibration system dynamic characteristic of a torque transfer system in a mechanical system of the engine testing system.
Figure 2B:
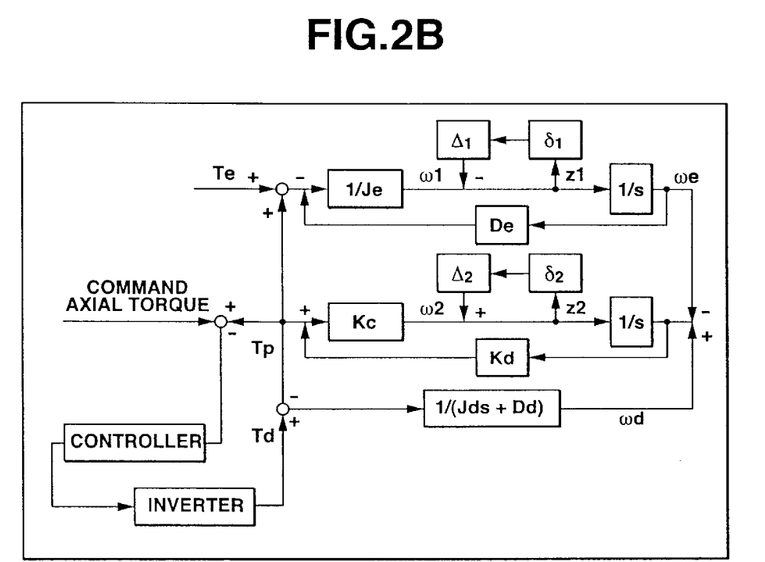
FIG. 2B is a block diagram showing an equivalent circuit of a transfer function of the modeled vibration system dynamic characteristic.

Referring to FIGS. 1 through 2B, there is shown a fundamental theory adapted to embodiments of a system and method of measuring characteristics of an engine in accordance with the present invention. A torque control system of the system of measuring the characteristics of the engine is constructed by means of the structured-singular-value synthesis method ($\mu$-synthesis method) wherein a disturbance input, a controlled variable and an uncertainty terms are employed as shown in FIGS. 1, 2A and 2B. It is known that the μ-synthesis method is capable of representing a magnitude of each uncertainty (perturbation) of an actual system using a structured singular value μ. Accordingly, it is possible to obtain the magnitude of each uncertainty so as to achieve the robust stability and the robust performance of the system, and to design the transfer function of a torque controller in the torque control system using the structured singular value μ.

FIG. 1 is a basic block diagram showing a basic theory employed in an engine testing system (engine bench-test system) according to the present invention. In FIG. 1, P(s) is a mechanical transfer function from an engine torque and a dynamo torque to an engine speed, an axial torque, and a dynamo speed. A(s) is an electric transfer function from a command current corresponding to the command dynamo torque to a current corresponding to the dynamo torque. C(s) is a transfer function of a torque controller designed by the μ-synthesis method. Δ and δ are uncertainty terms. These references P(s), A(s), C(s), Δ and δ are commonly employed in the whole embodiments discussed later.

A mechanical system of the engine testing system is constituted by a supplied engine 1, a dynamometer 2 and a shaft 3 connecting the engine 1 and the dynamometer 2, and therefore an equivalent circuit of the mechanical system can be represented by FIGS. 2A and 2B. More specifically, FIG. 2A shows a modeled vibration-system dynamic characteristic of a torque transfer system in the mechanical system, and FIG. 2B shows an equivalent circuit of the transfer function in the model of FIG. 2A. In FIGS. 2A and 2B, Te is an engine torque, ωe is an engine speed, Je is an inertia moment of the engine 1, De is a viscous friction coefficient of the engine 1, Kc is a spring coefficient of the shaft 3, Kd is a viscous friction coefficient of the shaft 3, Tp is an axial torque, Jd is an inertia moment of the dynamometer 2, Dd is a viscous friction coefficient of the dynamometer 2, Td is a torque of the dynamometer 2, ωd is a rotation speed of the dynamometer 2, and $\delta_1$, $\delta_2$, $\Delta_1$, and $\Delta_2$ are uncertainties.

In the thus constructed engine testing system according to the present invention, the μ-synthesis method adapted to the engine testing system employs a command speed, a command torque, and a speed detection noise of each of the engine 1 and the dynamometer 2, as a disturbance input, and further employs a speed difference between the engine 1 and the dynamometer 2, a command dynamo torque (a command value of a dynamo torque to the dynamometer 2) and an axial torque, as a controlled variable for measuring engine characteristics. By constructing the torque control system using the μ-synthesis method, the torque control system ensures a robust stability and a robust performance relative to the structured uncertainty.

Figure 3:
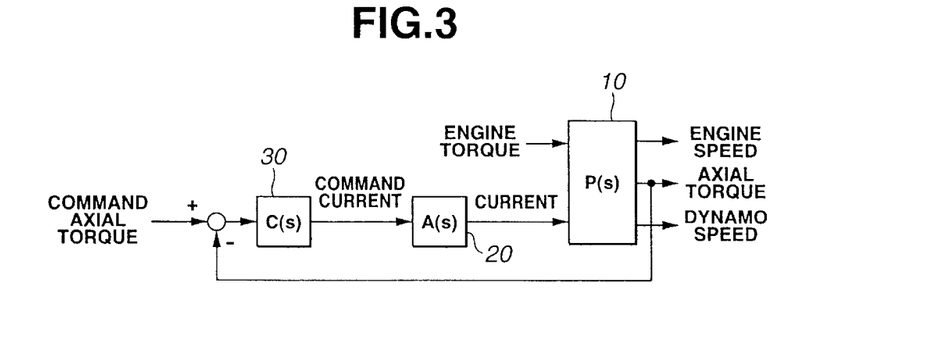
FIG. 3 is a block diagram showing a first embodiment of the system and method according to the present invention.

FIG. 3 shows a first embodiment of the engine testing system and a method employed therein according to the present invention.

In this first embodiment, the μ-synthesis method is employed to derive a torque controller 30 in a one-degree-of-freedom torque control system for controlling the axial torque by detecting the axial torque. More specifically, a transfer function C(s) of the torque controller 30 is derived using the μ-synthesis method wherein a command speed, a command torque, a speed detection noise of each of the engine 1 and the dynamometer 2 are appropriately employed as a disturbance input, and a speed deviation between the engine 1 and the dynamometer 2, a command dynamo torque (a command value of a dynamo torque to the dynamometer 2) and an axial torque are also appropriately employed as a controlled variable for measuring engine characteristics. Further, appropriate several factors in the mechanical system, such as an inertia moment of the engine 1, a spring constant of the shaft 3, an inertia moment of the dynamometer 2 are employed as an uncertainty term in the μ-synthesis method for obtaining the transfer function C(s). Furthermore, if the mechanical system generates or receives an inertia moment except for that of the engine 1 or the dynamometer 2, such inertia moment may be employed as an uncertainty term in the μ-synthesis method for obtaining the transfer function C(s).

The torque controller 30 represented by the transfer function C(s) receives a difference between the command axial and the axial torque outputted from a plant 10 and outputs a command current to an inverter 20. The inverter 20 represented by a transfer function A(s) receives the command current from the torque controller 30 and outputs a current to the plant 10 which corresponds to the mechanical system of the engine testing system and which is represented by a transfer function P(s). In this engine testing system of the first embodiment, various engine characteristics are measured by detecting the axial torque.

Figure 4:
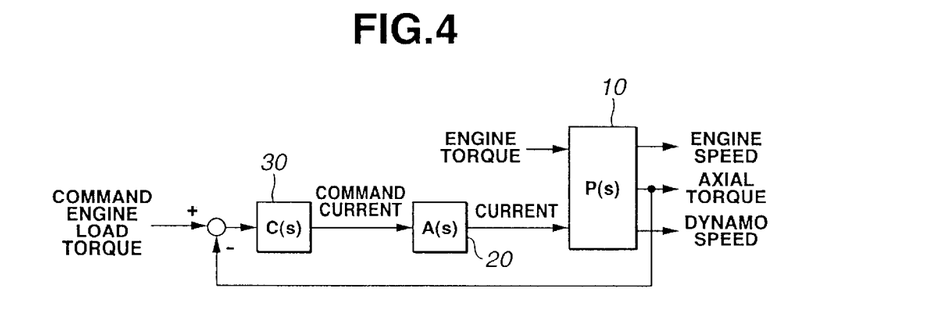
FIG. 4 is a block diagram showing a second embodiment of the system and method according to the present invention.

FIG. 4 shows a second embodiment of the engine testing system and the method employed therein according to the present invention.

In this second embodiment, the μ-synthesis method is employed to derive a torque controller 30 in a one-degree-of-freedom torque control system for controlling the engine load torque by detecting the axial torque. The transfer function C(s) of the torque controller 30 in this second embodiment is derived using the μ-synthesis method wherein a disturbance input, a controlled variable and an uncertainty are appropriately employed as is basically similar to the first embodiment. The torque controller 30 receives a difference between the command engine load torque and the axial torque and outputs the command current. In this engine testing system of the second embodiment, various engine characteristics are measured by detecting the axial torque.

Figure 5:
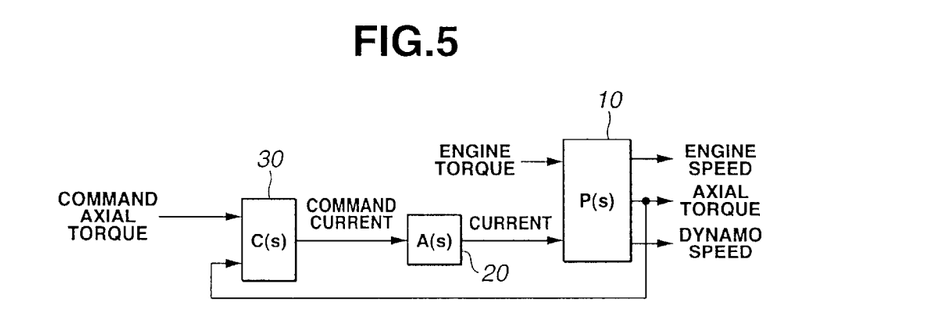
FIG. 5 is a block diagram showing a third embodiment of the system and method according to the present invention.

FIG. 5 shows a third embodiment of the engine testing system and the method employed in this system according to the present invention.

In this third embodiment, the μ-synthesis method is employed to derive a torque controller 30 represented by a transfer function C(s) in the two-degree-of-freedom torque control system for controlling the axial torque by detecting the axial torque. The transfer function C(s) of the torque controller 30 in this third embodiment is derived using the μ-synthesis method wherein a disturbance input, a controlled variable and an uncertainty are appropriately employed as is basically similar to the first embodiment. The torque controller 30 receives the command axial torque and the axial torque and outputs the command current. In this engine testing system of the third embodiment, various engine characteristics are measured by detecting the axial torque.

Figure 6:
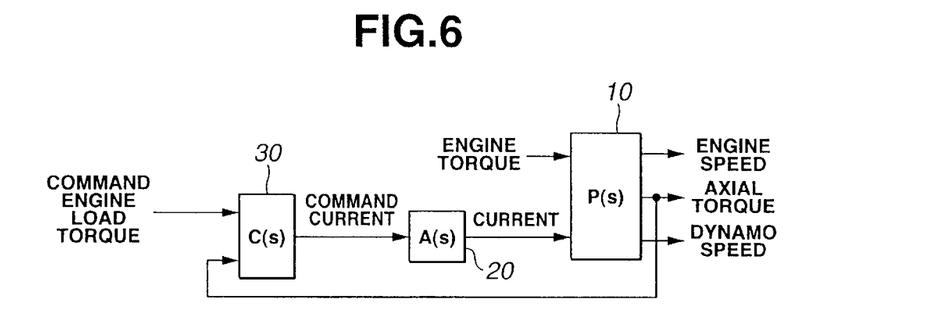
FIG. 6 is a block diagram showing a fourth embodiment of the system and method according to the present invention.

FIG. 6 shows a fourth embodiment of the engine testing system and the method employed in this system according to the present invention.

In this fourth embodiment, the μ-synthesis method is employed to derive a torque controller 30 represented by a transfer function C(s) in the two-degree-of-freedom torque control system for controlling the engine load torque by detecting the axial torque. The transfer function C(s) of the torque controller 30 in this fourth embodiment is derived using the μ-synthesis method wherein a disturbance input, a controlled variable and an uncertainty are appropriately employed as is basically similar to the first embodiment. The torque controller 30 receives the command engine load torque and the axial torque and outputs the command current. In this engine testing system of the fourth embodiment, various engine characteristics are measured by detecting the axial torque.

Figure 7:
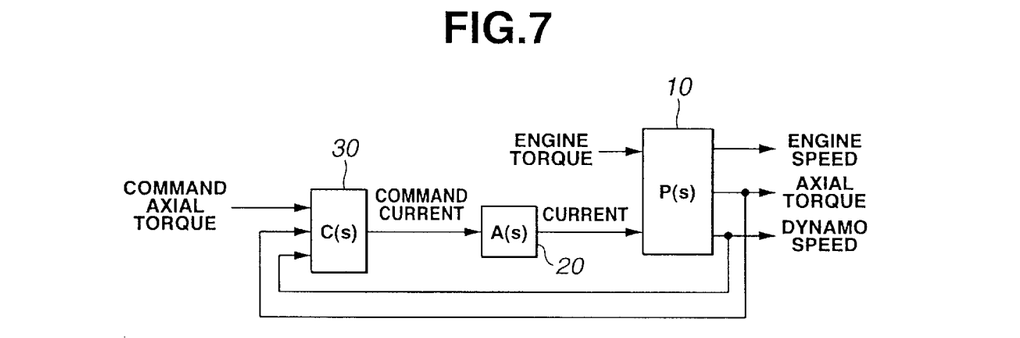
FIG. 7 is a block diagram showing a fifth embodiment of the system and method according to the present invention.

FIG. 7 shows a fifth embodiment of the engine testing system and the method employed in this system according to the present invention.

In this fifth embodiment, the $\mu$-synthesis method is employed to derive a feedback torque controller 30 represented by a transfer function C(s) in a torque control system for controlling the axial torque by detecting the axial torque and the dynamo speed. The transfer function C(s) of the feedback torque controller 30 in this fifth embodiment is derived using the $\mu$-synthesis method wherein a disturbance input, a controlled variable and an uncertainty are appropriately employed as is basically similar to the first embodiment. The torque controller 30 receives the command axial torque, the dynamo speed, and the axial torque and outputs the command current. In this engine testing system according to the fifth embodiment, various engine characteristics are measured by detecting the axial torque.

Figure 8:
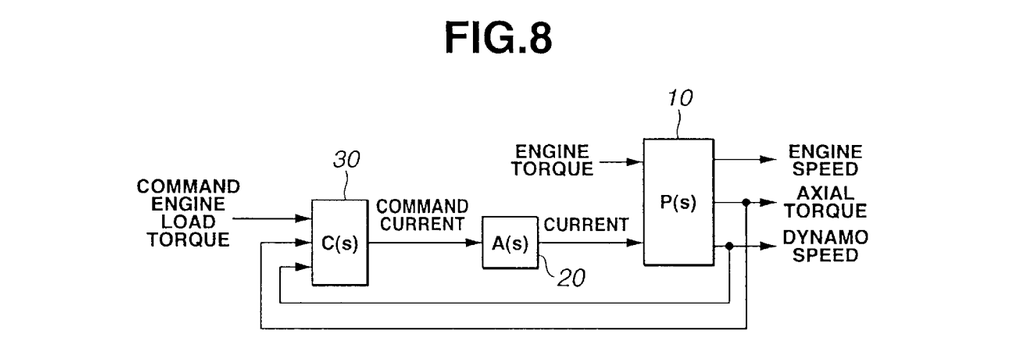
FIG. 8 is a block diagram showing a sixth embodiment of the system and method according to the present invention.

FIG. 8 shows a sixth embodiment of the engine testing system and the method employed in this system according to the present invention.

In this sixth embodiment, the $\mu$-synthesis method is employed to derive a feedback torque controller 30 represented by a transfer function C(s) in a torque control system for controlling the engine load torque by detecting the axial torque and the dynamo speed. The transfer function C(s) of the feedback torque controller 30 in this sixth embodiment is derived using the $\mu$-synthesis method wherein a disturbance input, a controlled variable and an uncertainty are appropriately employed as is basically similar to the first embodiment. The torque controller 30 receives the command engine load torque, the dynamo speed, and the axial torque and outputs the command current. In this engine testing system according to the sixth embodiment, various engine characteristics are measured by detecting the axial torque.

Figure 9:
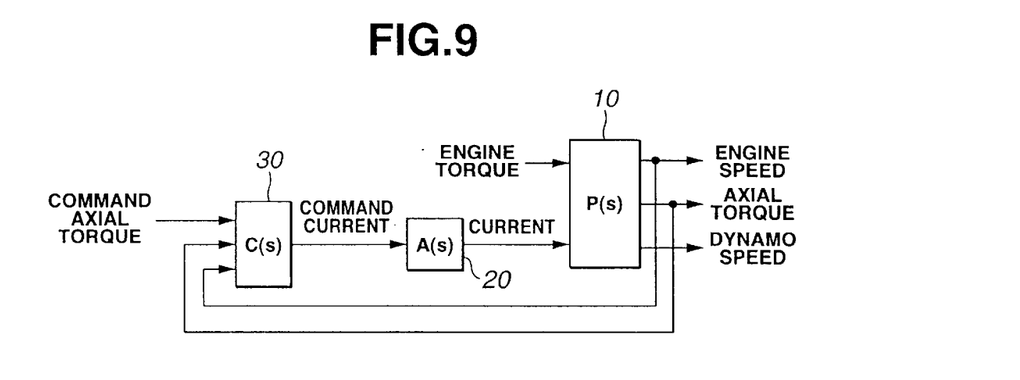
FIG. 9 is a block diagram showing a seventh embodiment of the system and method according to the present invention.

FIG. 9 shows a seventh embodiment of the engine testing system and the method employed in this system according to the present invention.

In this seventh embodiment, the $\mu$-synthesis method is employed to derive a feedback torque controller 30 represented by a transfer function C(s) in a torque control system for controlling the axial by detecting the engine speed and the axial torque. The transfer function C(s) of the feedback torque controller 30 in this seventh embodiment is derived using the $\mu$-synthesis method wherein a disturbance input, a controlled variable and an uncertainty are appropriately employed as is basically similar to the first embodiment. The torque controller 30 receives the command axial torque, the engine speed, and the axial torque and outputs the command current. In this engine testing system of the seventh embodiment, various engine characteristics are measured by detecting the axial torque.

Figure 10:
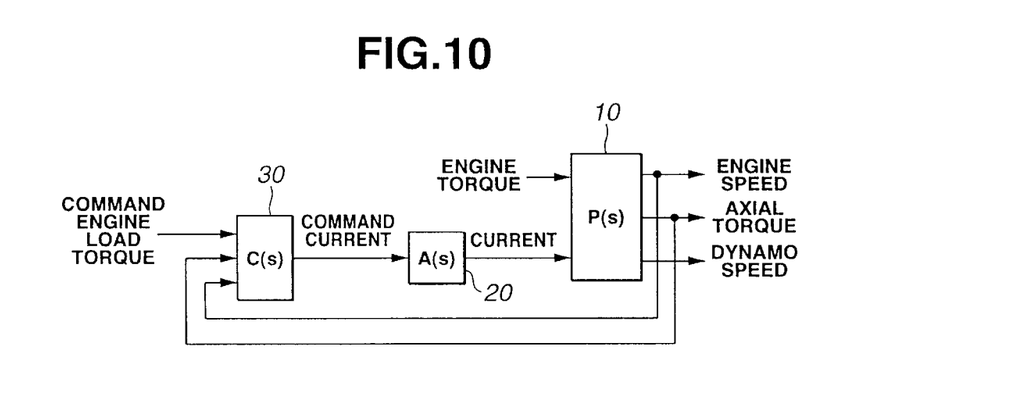
FIG. 10 is a block diagram showing an eighth embodiment of the system and method according to the present invention.

FIG. 10 shows an eighth embodiment of the engine testing system and the method employed in this system according to the present invention.

In this eighth embodiment, the $\mu$-synthesis method is employed to derive a feedback torque controller 30 represented by a transfer function C(s) in a torque control system for controlling the engine load torque by detecting the engine speed and the axial torque. The transfer function C(s) of the feedback torque controller 30 in this eighth embodiment is derived using the $\mu$-synthesis method wherein a disturbance input, a controlled variable and an uncertainty are appropriately employed as is basically similar to the first embodiment. The torque controller 30 receives the command engine load torque, the engine speed, and the axial torque and outputs the command current. In this engine testing system, various engine characteristics are measured by detecting the axial torque.

Figure 11:
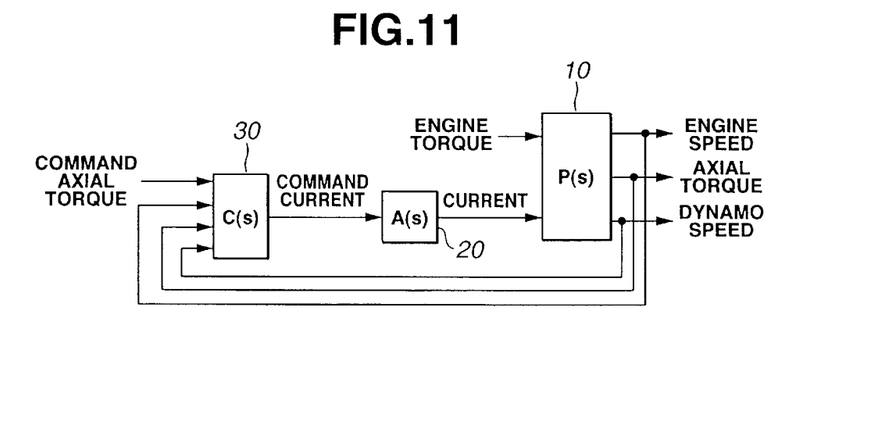
FIG. 11 is a block diagram showing a ninth embodiment of the system and method according to the present invention.

FIG. 11 shows a ninth embodiment of the engine testing system and the method employed in this system according to the present invention.

In this ninth embodiment, the $\mu$-synthesis method is employed to derive a feedback torque controller 30 represented by a transfer function C(s) in a torque control system for controlling the axial torque by detecting the engine speed, the axial torque and the dynamo speed. The transfer function C(s) of the feedback torque controller 30 in this ninth embodiment is derived using the $\mu$-synthesis method wherein a disturbance input, a controlled variable and an uncertainty are appropriately employed as is basically similar to the first embodiment. The torque controller 30 receives the command axial torque, the engine speed, the dynamo speed, and the axial torque and outputs the command current. In this engine testing system, various engine characteristics are measured by detecting the axial torque.

Figure 12:
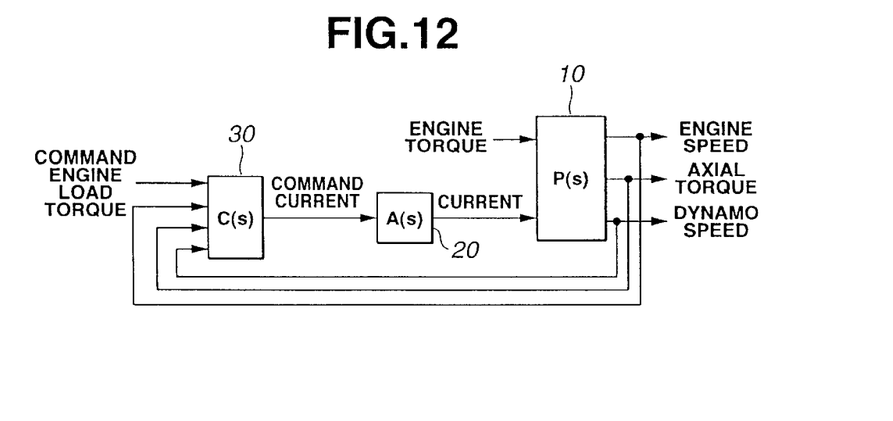
FIG. 12 is a block diagram showing a tenth embodiment of the system and method according to the present invention.

FIG. 12 shows a tenth embodiment of the engine testing system and the method employed in this system according to the present invention.

In this tenth embodiment, the $\mu$-synthesis method is employed to derive a feedback torque controller 30 represented by a transfer function C(s) in a torque control system for controlling the engine load torque by detecting the engine speed, the axial torque and the dynamo speed. The transfer function C(s) of the feedback torque controller 30 in this tenth embodiment is derived using the $\mu$-synthesis method wherein a disturbance input, a controlled variable and an uncertainty are appropriately employed as is basically similar to the first embodiment. The torque controller 30 receives the command engine load torque, the engine speed, the dynamo speed, and the axial torque and outputs the command current. In this engine testing system, various engine characteristics are measured by detecting the axial torque.

With the thus arranged embodiments according to the present invention, the axial torque or the engine torque is controlled by means of the torque controller 30 represented by the transfer function C(s) designed based on the $\mu$-synthesis method. Therefore, it becomes possible to stably execute a measurement of various characteristics of the engine 1 in a high speed condition.

This application is based on Japanese Patent Applications No. 2001-343238 filed on Nov. 8, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching.

What is claimed is:

1. A system for measuring characteristics of an engine, the system being constructed by connecting the engine with a dynamometer via a shaft, the system comprising:

a torque control system which controls at least one of an axial torque of the shaft and an engine load torque, the torque control system comprising, a first block represented by a mechanical transfer function, the first block receiving an engine torque and a current and outputting an engine speed, the axial torque and a dynamo speed, a second block represented by an electric transfer function, the second block receiving a command current and outputting the current, and a torque controller receiving one of a command axial torque and a command engine load torque, and at least one of the engine speed, the dynamo speed, and the axial torque and outputting the command current, the torque controller being represented by a transfer function designed using the structured singular value synthesis method so as to be adapted to the mechanical transfer function and the electric transfer function.

2. The system as claimed in claim 1, wherein the transfer function of the torque controller is designed so as to achieve the robust stability and the robust performance of the torque control system.

3. The system as claimed in claim 1, wherein a disturbance input employed in the structured singular value synthesis method includes at least one of the engine torque, a signal added to the axial torque, a signal added to the dynamo torque, a signal added to the command dynamo torque, a signal added to the engine torque, a signal added to the dynamo torque, the command axial torque and the command engine load torque.

4. The system as claimed in claim 1, wherein a controlled variable employed in the structured singular value synthesis method includes at least one of a difference between the command axial torque and the detected axial torque, the command dynamo torque, the dynamo torque, and the axial torque.

5. The system as claimed in claim 3, wherein a difference between a rotation angle of the dynamometer and a rotation angle of the engine is employed as the axial torque.

6. The system as claimed in claim 1, wherein when an inertia moment of a member except for the engine and the dynamometer is generated in the torque control system, the inertia moment of the member is employed as a controlled variable in the structured singular value synthesis method.

7. The system as claimed in claim 1, wherein an uncertainty term employed in the structured singular value synthesis method includes at least one of the engine inertia moment, an axial spring constant of the shaft, and the dynamo inertia moment.

8. The system as claimed in claim 7, wherein the uncertainty term employed in the structured singular value synthesis method further includes at least one of an inertia moment of a member except for the engine and the dynamometer and an axial spring constant of a member except for the shaft.

9. A method for measuring characteristics of an engine using a torque control system for controlling at least one of an axial torque and an engine load torque in a system of the engine, the dynamometer, and the shaft, the method comprising the steps of:

receiving an engine torque and a current and outputting an engine speed, the axial torque and a dynamo speed;

receiving a command current and outputting the current; and receiving one of a command axial torque and a command engine load torque, and at least one of the engine speed, the dynamo speed, and the axial torque and outputting the command current, by means of a torque controller which is represented by a transfer function designed using the structured singular value synthesis method so as to be adapted to the mechanical transfer function and the electric transfer function.

10. The method as claimed in claim 9, wherein the transfer function of the torque controller is designed so as to achieve the robust stability and the robust performance of the torque control system.

11. The method as claimed in claim 9, wherein a disturbance input employed in the structured singular value synthesis method includes at least one of the engine torque, a signal added to the axial torque, a signal added to the dynamo torque, a signal added to the command dynamo torque, a signal added to the engine torque, a signal added to the dynamo torque, the command axial torque and the command engine load torque.

12. The method as claimed in claim 9, wherein a controlled variable employed in the structured singular value synthesis method includes at least one of a difference between the command axial torque and the detected axial torque, the command dynamo torque, the dynamo torque, and the axial torque.

13. The method as claimed in claim 11, wherein a difference between a rotation angle of the dynamometer and a rotation angle of the engine is employed as the axial torque.

14. The method as claimed in claim 9, wherein when an inertia moment of a member except for the engine and the dynamometer is generated in the torque control system, the inertia moment of the member is employed as a controlled variable in the structured singular value synthesis method.

15. The method as claimed in claim 9, wherein an uncertainty term employed in the structured singular value synthesis method includes at least one of the engine inertia moment, an axial spring constant of the shaft, and the dynamo inertia moment.

16. The method as claimed in claim 15, wherein the uncertainty term employed in the structured singular value synthesis method further includes at least one of an inertia moment of a member except for the engine and the dynamometer and an axial spring constant of a member except for the shaft.

* * * * *